June 7, 1960 R. S. LUCE 2,939,423
EGG INCUBATOR
Filed Feb. 19, 1958 3 Sheets-Sheet 1

Ronald S. Luce
INVENTOR.

BY
Attorneys

June 7, 1960
R. S. LUCE
2,939,423
EGG INCUBATOR
Filed Feb. 19, 1958
3 Sheets-Sheet 2
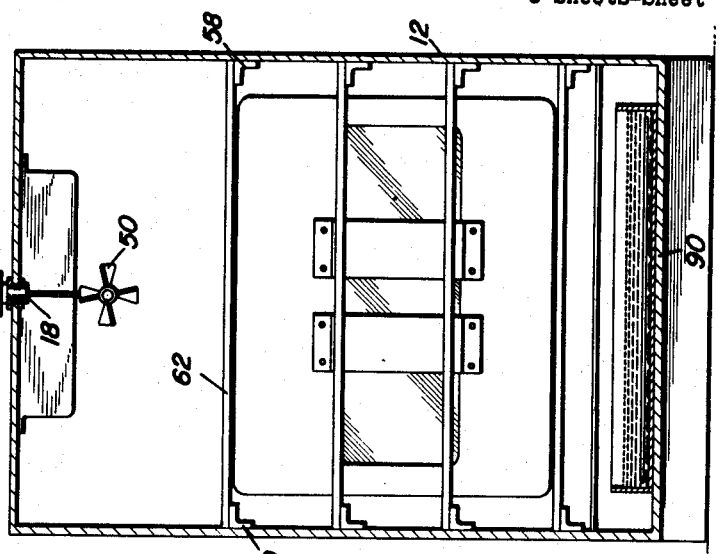
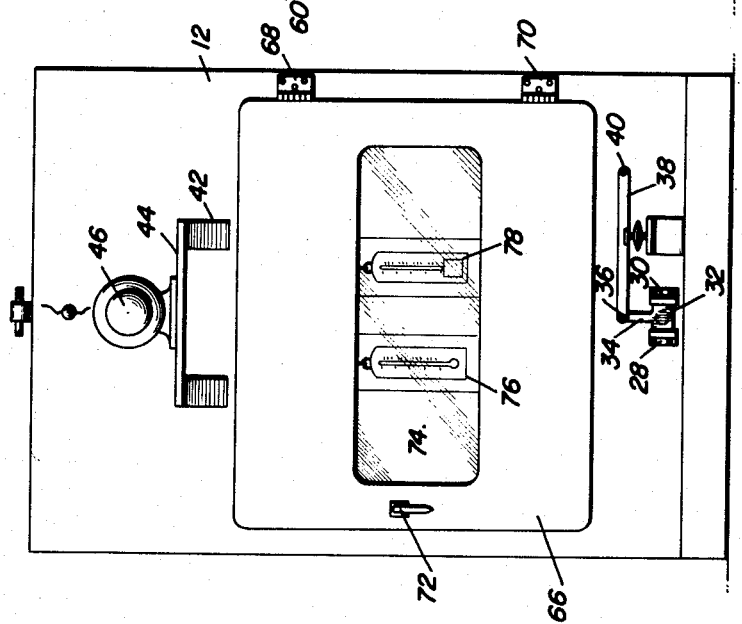
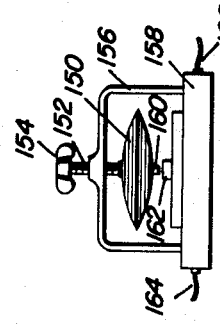
Ronald S. Luce
INVENTOR.

June 7, 1960  R. S. LUCE  2,939,423
EGG INCUBATOR
Filed Feb. 19, 1958  3 Sheets-Sheet 3
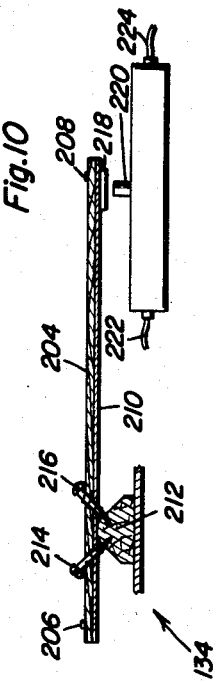
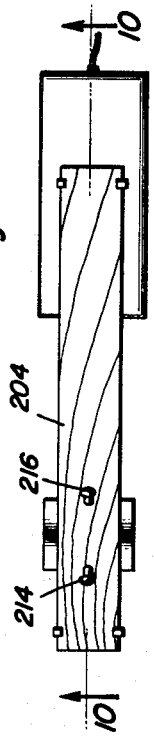
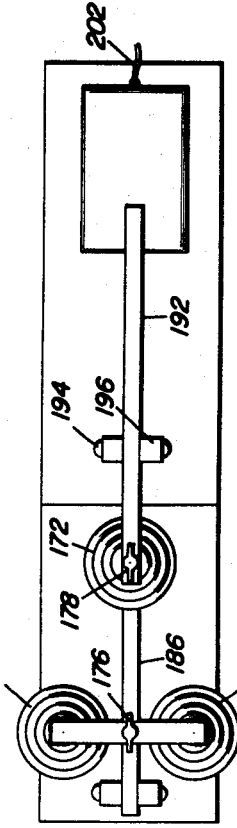
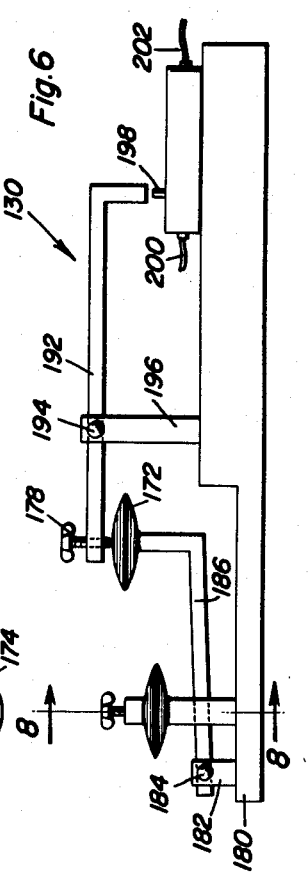
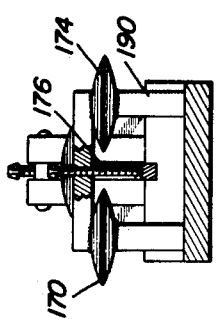
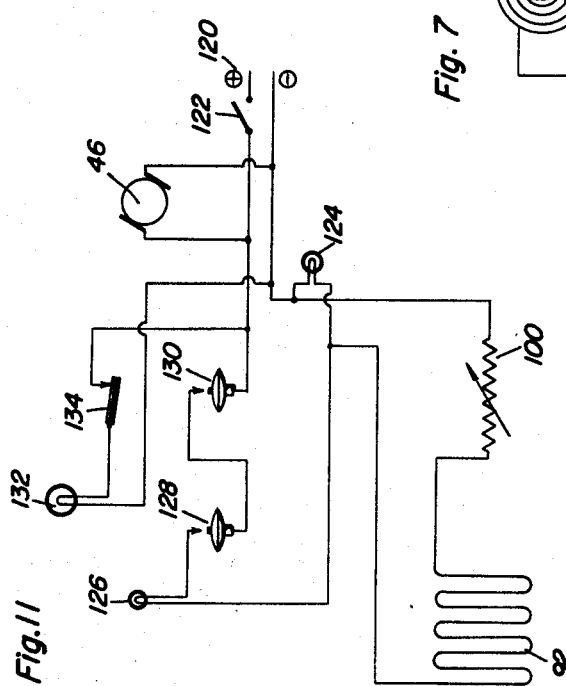
Ronald S. Luce
INVENTOR.
BY 
United States Patent Office 2,939,423
Patented June 7, 1960

2,939,423

EGG INCUBATOR

Ronald S. Luce, Columbia Falls, Mont.

Filed Feb. 19, 1958, Ser. No. 716,181

3 Claims. (Cl. 119—37)

This invention relates generally to an egg incubator and more particularly to an incubator system which provides for exact control of temperature and humidity within the incubator.

In the incubation of eggs, it is of extreme importance to provide for the exact control of temperature and humidity within the incubator because these two factors largely control the percentage of hatchability of a batch of eggs. The period of incubation of hen's eggs is twenty-one days. It has been found that for best results, the temperature and humidity should be kept constant throughout eighteen days of this period. But, however, it has further been found that during the remainder of the period, the humidity should be increased while the temperature may still be held constant. The reason for increasing the humidity in the latter portion of the incubation period is that during this time the chicks start to breathe within the shell and so need a higher humidity. Furthermore, the higher humidity makes the egg shell easier for the chick to break, and also keeps the shell, when it is broken, from sticking to the chick's down. If the humidity is not properly controlled and the air within the incubation chamber is too humid, the chicks will be weakened to the point where they may not be able to break the shell.

Incubators in use at the present time lack the exact temperature and humidity control achieved by this invention. They particularly lack the humidity control during last three days of incubation as above noted, because of two factors: (1) The heat of the motor on the inside of the incubator and (2) The heat produced by the chicks breathing within their shells. The additional heat from these two sources requires a reduction of the electrical heating. This reduction of electric heat also leads to an undesirable reduction of humidity. Therefore, it is the principal object of this invention to provide a novel and improved incubator system which allows for the exact control of temperature and humidity.

It is a further object of this invention to provide a novel and improved incubator system which allows for the adjustment of humidity for a particular temperature.

It is a still further object of this invention to provide a novel and improved incubator system which presents an incubator chamber virtually free from any uncontrolled heating effect.

It is a still further object of this invention to provide novel and improved circuitry including means for responding to the ambient temperature and humidity conditions within the incubator.

It is a still further object of this invention to provide the novel and improved incubation system noted above which is more reliable and efficient than heretofore known incubator devices while being clearly competitive in cost.

In accordance with the above stated objects, below is particularly described the novel and improved construction for the egg incubator system. The invention contemplates the utilization of a closed housing having means within the housing for circulating the air therein. The housing includes vents which are operated in response to the temperature of the air surrounding the outer portion of the housing. Electrically energized heating elements are supported within the housing and are electrically controlled by temperature responsive electrical switches. At least one of the electrical heating elements is situated proximate the water supply so as to evaporate the water to keep the incubator air humid. At least one other heating element is supported in the incubator at a particular distance from the water supply and has means to vary the emitted heat therefrom so as to provide either moister or drier heat selectively for the total amount of heat provided. Still further, the humidity responsive switch is provided which actuates a remote source of heat for providing dry heat when the humidity rises beyond certain limit.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is an elevational end view of the incubator;

Figure 3 is a sectional view taken substantially along the plane 3—3 of Figure 1;

Figure 4 is an elevational plan view of an auxiliary temperature responsive circuit breaker;

Figure 5 is an elevational front view of the auxiliary circuit breaker;

Figure 6 is an elevational side view of the main temperature responsive circuit breaker;

Figure 7 is an elevational side view of the main circuit breaker;

Figure 8 is a sectional view taken substantially along the plane 8—8 of Figure 6;

Figure 9 is an elevational plan view of the humidity responsive switch incorporated as part of this invention;

Figure 10 is a sectional view taken substantially along the plane 10—10 of Figure 9; and Figure 11 is an electrical circuit diagram indicating the electrical circuitry and mode of operation of this invention.

Figure 1:
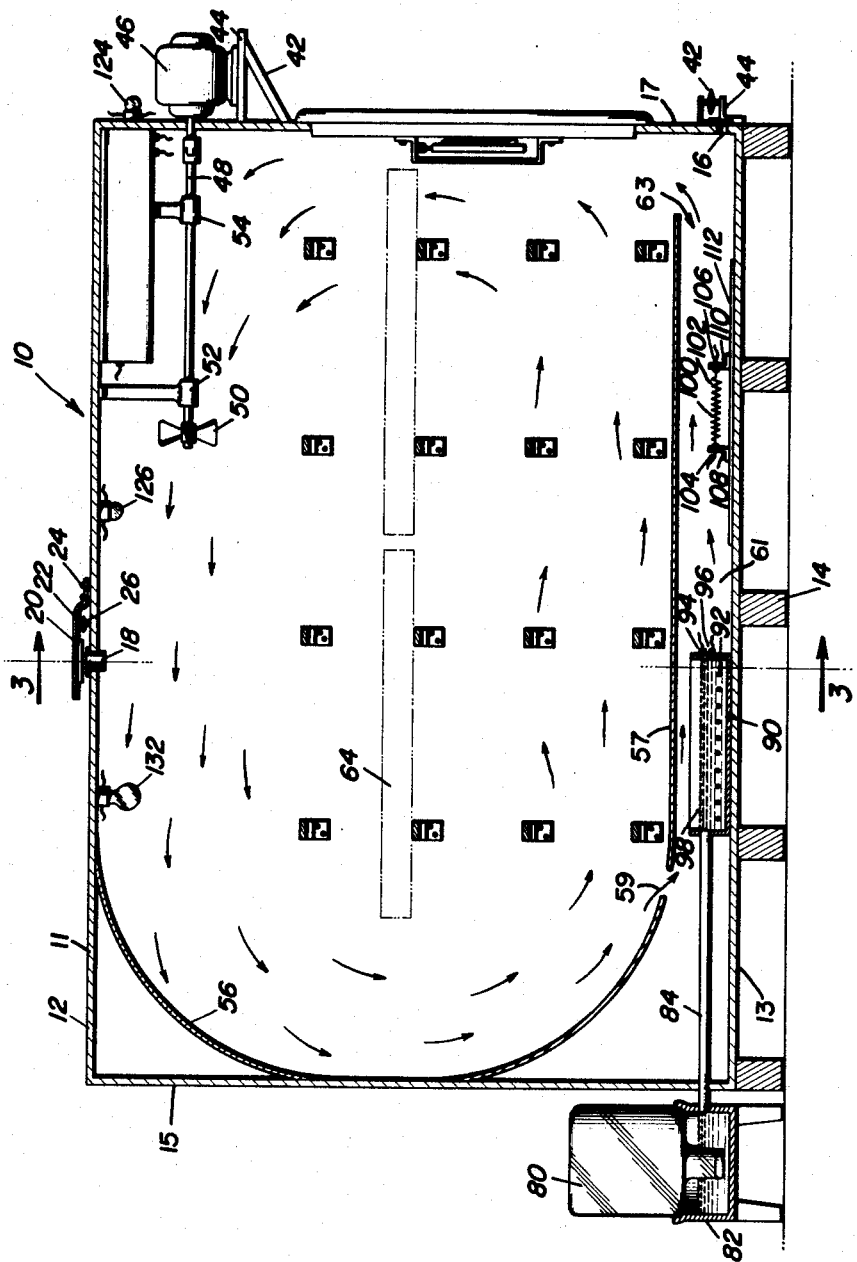
Figure 1 is a cross-sectional side view of the incubator.

With continuing reference to the drawings, and with particular reference to Figure 1 the numeral 10 generally designates the incubator comprising this invention including a closed housing 12 having a top 11, bottom 13, and a pair of ends 15 and 17 supported as by legs 14. The housing 12 further is provided with vent passages as at 16 and 18 for communicating with the surrounding air. It will be noticed that each of the vent passages 16 and 18 have valves adjacent the passages which are adapted to be actuated by temperature responsive means. More particularly, vent passage 18 has a valve cover 20 adjacent thereto which is carried by a resilient arm 22 cantilevered to the housing by bolts as at 24. An expandable temperature responsive wafer 26 sits between the housing 12 and the resilient arm 22. The resilient arm normally will tightly close the valve cover 20 on the passage 18 thereby cutting off communication between the outside air and the air within the incubator. However, upon a rise in the outside tempererature the expandable wafer 26 will expand and force resilient arm 22 about the cantilever connection as at 24 and thereby unseat the valve cover 20 from the passage 18. The passage 16 has a guide member 28 and 30 on either side thereof which accommodates a slidable valve door 32 for blocking the communication along the passage 16 between the air within the incubator and the outside air. The door 32 is integral with arm 34 pivotally connected at 36 to arm 38 which is pivotally cantilevered to the housing 12 at 40. A temperature responsive wafer 42 is supported between a flange 44 affixed to the housing 12 and the arm 38. The passage 16 is normally closed by the door 32 but a rise in the outside temperature will cause an expansion of the expandable wafer 42, thereby pivoting arm 38 about pivotal connection 40 and allowing the door 32 to open the passage 16. The vents 16 and 18 may be set to open at any desired temperature. By opening at a particular temperature and closing below it, the vents assist the other parts of the device in maintaining constant interior temperature and humidity.

The housing 12 has a bracket 42 affixed thereto which maintains a shelf 44 thereon. The shelf 44 carries an electric motor 46 which is coupled to an extended shaft 48 to a propeller 50 supported within the housing 12 for driving the air within the housing according to a path substantially described by the arrows. The shaft 48 is rotatably supported within depending collars 52 and 54. The propeller 50 drives the air according to the described path with the aid of arcuate shaped baffles as at 56 mounted on housing end 15. A transverse plate 57 is supported in the housing 12 spaced from the bottom 13 and substantially in alignment with one end of the baffle 56. The space defined between the plate 57 and bottom 13 constitutes the wet heat control compartment 61 with the opening 59 between baffle 56 and plate 57 forming a compartment inlet. Opening 63 forms a compartment outlet.

Aligned angle brackets as at 58 and 60 support a shelf 62 therebetween. Obviously, the number of shelves included in the particular incubator is subject to the particular design features of the particular device. Figure 3 shows the incubator utilized with four shelves but the number of shelves or the particular construction is not material to this invention. However, it is to be noted that Figure 1 illustrates the utilization of the shelves 62 to support egg racks 64 shown in phantom lines.

With particular reference to Figure 2, a door 66 is shown hinged to the housing 12 as at 68 and 70 provided with a handle and latch combination as at 72. The frame of the door 66 is lined, as with rubber, for maintaining an airtight relationship between the air within the incubator and the outer air. A transparent window 74 is constructed in the door 66 to reveal temperature readings on the thermometer 76 and humidity readings on the hygrometer 78. It is to be noted that the motor 46 is supported outside of the incubator chamber so that the motor heat will not affect the inner controlled air.

An inverted jug 80 is supported by and supplies water to a reservoir 82 which communicates by a hose 84 with an open water pan 90. The pan 90 has affixed therein a heating coil as at 92 which is adapted to be electrically energized through the terminals 94 and 96. It will be apparent that the heat given off by the heating coil 92 will cause an evaporation of the water 98 in the pan 90. This evaporation will cause a rise in the humidity of the air within the incubator.

A second heating coil 100 adapted to be electrically energized through leads 102 and 104 is maintained between two angle clamps as 106 and 108 which are slidably supported by bolts 110 in a rack 112. The connection 102 to the heating coil 100 is adapted to be moved along the coil so to vary the amount of heat emitted therefrom. It will be apparent that when the heating coil 100 is emitting an extreme amount of heat, the total heat given off will be substantially dry. If the heating coil 100 is emitting less heat by adjusting the connection 102, the total heat offered by the heating coils will be substantially moister. As noted above, therefore, in the last three days of incubation where a higher himidity is required, the heating coil 100 need merely be adjusted by moving connection 102. It should of course be apparent that the inverted jug 80 will supply water to the reservoir 82 and pan 90 and the water in the reservoir and pan will seek common levels.

Referring particularly to Figure 11 and the circuitry and operation of this invention, a source of electrical energy is shown at 120 with a main switch 122 interposed between the source and the electrical circuitry. Though the source 120 is illustrated as being of direct current, there is no restriction on the type of electrical source to be used. The heating coil 100 is shown connected to one side of the line and is serially connected to the heating coil 92 in the water pan. A pilot light 124 is shown electrically connected across the serially connected heating coils 92 and 100. The pilot light 124 is shown supported exteriorly of the housing in Figure 1. When the light 124 is on it means that a current is flowing through the serially connected heating coils 92 and 100 supplying heat to the air in the incubator. A second pilot 126 is shown electrically in series with the heating coil 92. The circuit continues through an auxiliary temperature responsive switch symbolically shown at 128 and a main temperature responsive switch 130 and returned to the other side of the electric source 120. The electric motor 46 is shown electrically connected across the lines from the electric source. Another circuit is shown connected across the lines from the source 120 and includes a high wattage bulb 132 which supplies dry heat to the incubator chamber when a humidity responsive switch 134 closes the circuit across the bulb 132. It should be apparent from Figure 11 that the exact control of temperature and humidity is established by the features of this invention. The temperature responsive devices 128 and 130 are only symbolically shown in Figure 11 but it will be realized that an increase in temperature sufficient to actuate the temperature responsive devices 128 and 130 will cause an opening of the circuit to the heating elements 92 and 100. If for a particular amount of heat, more humidity is desired, the heating element 100 may be moved closer to the water pan 90. If less moisture is desired the heating element 100 may be moved remote from the pan 90. If the air within the incubator is very humid, the switch 134 which is humidity responsive will close actuating bulb 132 which supplies heat to the incubator chamber remote from the pan 90. That is, the bulb 132 supplies dry heat to bring down the humidity.

Figures 4 and 5 show the auxiliary circuit breaker which includes a base having a magnetic switch therein which opens upon expansion of the expandable wafer 150 due to a temperature rise. The wafer 150 is adjustably supported by a bolt 152 and winged portion 154. The bolt 152 is threadedly engaged with an aperture in a yoke 156 which is fixed on the base 158. The wafer 150 carries an actuating portion 160 which contacts the magnetic switch portion 162 for opening the circuit between leads 164 and 166. The main circuit breaker is shown in Figures 6, 7 and 8 and is similar in principle to the auxiliary circuit breaker of Figures 4 and 5. However, the main circuit breaker includes three temperature responsive wafers 170, 172 and 174 and adjustable bolt means 176 and 178. The base 180 supports a pair of spaced ears 182 which in turn pivotally support at 184 an arm 186 carrying the temperature wafer 172. A yoke 190 has the temperature wafers 170 and 174 interposed therein. The bight portion of the yoke 190 has an aperture through which the bolt 176 is threaded. The bolt 176 contacts the arm 186 so as to vary the pressure and height on the arm 186 and serve to vary the relationship between the temperature responsive wafer 172 and the adjustable bolt 178 which is threaded terminally through a second arm 192 pivotally supported at 194 in brackets 196. The arm 192 is adapted to contact a portion 198 of a magnetic switch for breaking contact between the conductors 200 and 202. The humidity responsive device 134 includes a strip of wood 204 which is affixed at its ends 206 and 208 to a parallel and adjacent metal sheet 210. The combination is mounted on a pivot point 212 by screws 214 and 216. The metal strip 210 carries a projection 218 on the end thereof adapted to contact a portion 220 of the magnetic switch for breaking the circuit between conductor 222 and 224. In the operation of this humidity responsive switch, the increase in humidity will cause an absorption and expansion by the wooden strip 204 while the metal strip 210 will retain its original length. The increased length of the wooden strip 204 and the fact that respective ends of the strips 204 and 210 are fastened together will cause a bending about pivot point 212 and a contact between 218 and 220, thereby breaking contact between conductors 222 and 224 through the magnetic switch snap action.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An egg incubator comprising an airtight housing, shelves supported in said housing carrying egg racks, a hingedly supported door on said housing for gaining entrance thereto, said housing defining a top, a bottom, and a pair of ends, means in said housing for circulating air, said means including a fan positioned on a first end of said housing adjacent said top and rotatably mounted about a horizontal axis, arcuate baffles mounted on a second end of said housing opposed to said fan for directing said air along a predetermined path, driving means for driving said fan, said driving means positioned externally of said housing, said housing including controlled vents for selectively opening said housing to ambient conditions, a temperature and humidity detection and regulation system within said housing, said temperature and humidity detection and regulation system including a source of electrical energy, a dry heat source mounted on said top in said predetermined path, a variable wet heat source, a plate supported in said housing spaced from said baffles and said bottom defining a wet heat control compartment between said plate and said bottom, a compartment inlet, a compartment outlet, said baffles directing a portion of said circulating air through said compartment over said variable wet heat source, a humidity responsive switch electrically connected in series with said electrical energy source and said dry heat source, a temperature responsive switch electrically connected in series with said electrical energy source and said variable wet heat source, said variable wet heat source including an open pan adjacent said compartment inlet having water therein, a first electric heating coil disposed in said pan, a second electric heating coil spaced from said pan adjacent said compartment outlet, said first and second heating coils electrically serially connected.

2. The combination of claim 1 wherein pilot lights are electrically connected to said coils for indicating the energization thereof.

3. The combination of claim 1 wherein said controlled vents are positioned in said top and said second housing end.

References Cited in the file of this patent
UNITED STATES PATENTS

| | | |
|---|---|---|
| 2,319,091 | Smith et al. | May 11, 1943 |
| 2,603,182 | Markey | July 15, 1952 |
| 2,654,345 | Edwards | Oct. 6, 1953 |